United States Patent [19]
Mossi et al.

[11] Patent Number: 5,431,436
[45] Date of Patent: Jul. 11, 1995

[54] AIRBAG MODULE

[75] Inventors: G. Dean Mossi, Roy; Brett R. Garner, South Weber, both of Utah

[73] Assignee: Morton International, Inc., Chicago, Ill.

[21] Appl. No.: 124,713

[22] Filed: Sep. 21, 1993

[51] Int. Cl.⁶ .............................................. B60R 21/16
[52] U.S. Cl. .................................. 280/728.1; 280/732
[58] Field of Search ............... 280/728 R, 728 B, 732; 220/675

[56] References Cited

U.S. PATENT DOCUMENTS

| | | | |
|---|---|---|---|
| 3,599,800 | 8/1971 | Durante | 211/128 |
| 4,308,696 | 1/1982 | Schroeder | 52/11 |
| 4,466,533 | 8/1984 | Shwayder | 198/676 |
| 4,872,608 | 10/1989 | Lake | 229/2.5 |
| 4,941,678 | 7/1990 | Lauritzen et al. | 280/732 |
| 5,263,739 | 11/1993 | Webber et al. | 280/732 |
| 5,280,948 | 1/1994 | Henseler et al. | 280/728 R |

FOREIGN PATENT DOCUMENTS 2520238  7/1983  France ................. 280/728

Primary Examiner—Margaret A. Focarino
Assistant Examiner—Paul N. Dickson
Attorney, Agent, or Firm—George W. Rauchfuss, Jr.; Gerald K. White

[57] ABSTRACT

A passenger side airbag module assembly is formed from a plastic extrusion which includes both a trough and an integral cover. The airbag itself has a rectangular mouth bounded on two opposite sides by stiff rods. The inner surface of the trough includes channels into which the rods are inserted to secure the airbag.

9 Claims, 3 Drawing Sheets

5,431,436

AIRBAG MODULE

TECHNICAL FIELD

This invention relates to vehicle airbag modules. More particularly, it relates to a passenger side airbag module comprising an extruded canister and novel airbag retention means.

BACKGROUND ART

Conventional passenger side airbag modules comprise a reaction canister of steel or aluminum. The canister is trough-shaped and has an open top. A collapsed airbag is retained and supported within and near the top of the canister by a retainer or diffuser. The ends of the canister are closed by end plates. The end plates include openings for receiving and supporting a cylindrical gas generating inflator below the folded airbag. The canister includes means for retaining thereon a separate cover which may form a portion of the vehicle's instrument panel. Examples of prior art modules may be found in U.S. Pat. No. 4,941,678 of Lauritzen et al. and the patents and applications referenced therein.

It would be desirable to reduce both the weight and complexity of the passenger side airbag module assembly. It would also be desirable to provide such an assembly wherein the reaction canister has a closed top to both retain the airbag within the module and prevent foreign objects from entering the module prior to its installation in a vehicle.

The primary object of the present invention is to provide a passenger side airbag module assembly which has an integral cover for protecting the folded airbag prior to installation. Another object is to provide such a reaction canister having improved means for assembling and retaining the folded airbag within the canister. Another object is to provide such an assembly which is lightweight and has substantially fewer parts than prior art modules. Other objects, features and advantages will become apparent from the following description and appended claims.

DISCLOSURE OF INVENTION

The foregoing objects are achieved by providing a reaction canister with a body and integral cover extruded from a high strength thermoplastic. The extrusion includes a pair of semi-cylindrical channels on the inner sidewalls of the canister for securing, by means of rods or dowels, the open mouth of the airbag.

BEST MODE FOR CARRYING OUT THE INVENTION

Figure 1:
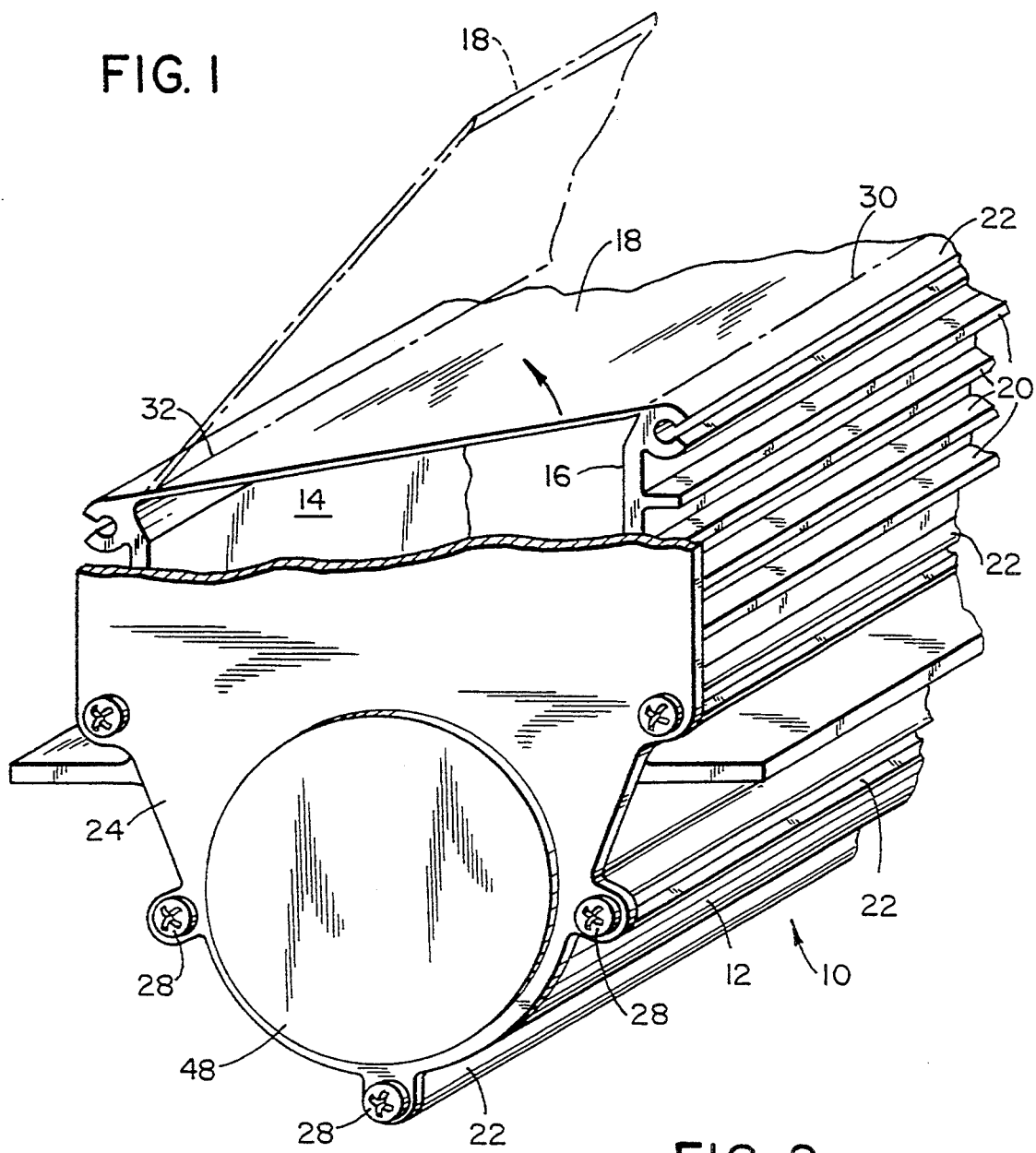
FIG. 1 is a perspective view of an airbag module in accordance with the invention, partially broken away to illustrate its construction.

In accordance with the present invention, the reaction canister for a passenger side airbag module is extruded as a one-piece trough and cover. FIG. 1 illustrates such a canister 10. The canister 10 includes a semi-cylindrical bottom portion 12 surmounted by left 14 and right 16 sidewalls. The left and right sidewalls define a top which is closed by an integral cover 18. The canister 10 is a high strength thermoplastic which may be either unfilled or filled with reinforcement fibers such as glass, carbon, quartz, graphite, etc. Examples of suitable thermoplastics include, but are not limited to, nylon, polyvinyl-chloride, acrylonitrile-butadiene-styrene resin, and polyphenylene oxide based resins such as Noryl (a trademark of General Electric company). The extrusion may include any desired structural elements such as, for example, stiffening ribs 20 and end plate attachment channels 22. End plates 24 and 26 are attached to the ends of the canister 10 by means of self-tapping screws 28 which are threaded into the ends of the attachment channels 22.

Figure 2:
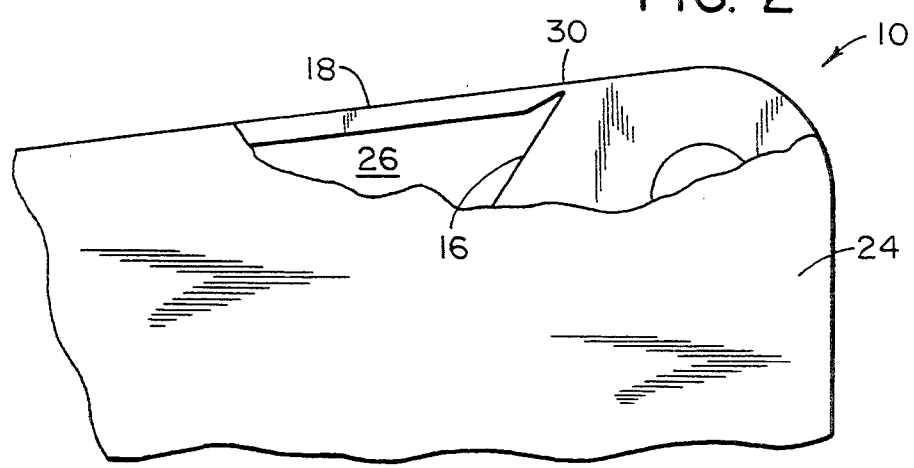
FIG. 2 is an enlarged detail of a portion of the module of FIG. 1.
Figure 3:
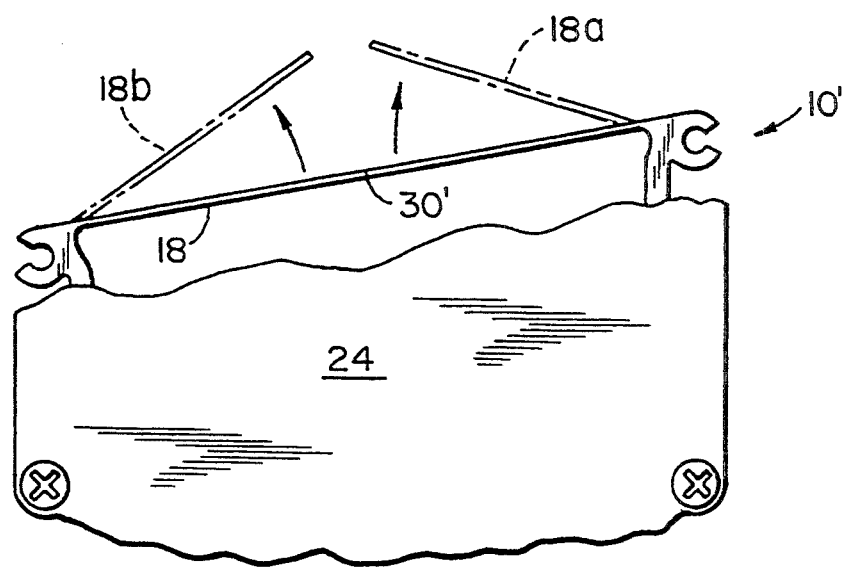
FIG. 3 is a partial end view of a modified form of the invention of FIG. 1.

As will be apparent from FIG. 1, the canister extrusion is in the form of a tube having a flat surface formed by the cover 18. However, as shown in FIG. 2, the cover 18 is formed with a tearline 30 in the form of a region of reduced thickness adjacent the sidewall 16. The expanding airbag within the canister 10 causes the cover 18 to split along the tearline 30, forming a door which opens along a hinge line 32 adjacent the left sidewall 14, as illustrated in FIG. 1. FIG. 3 illustrates a modified canister 10' wherein the tearline 30' is located in the center of cover 18 so as to form two doors 18a, 18b.

Figure 4:
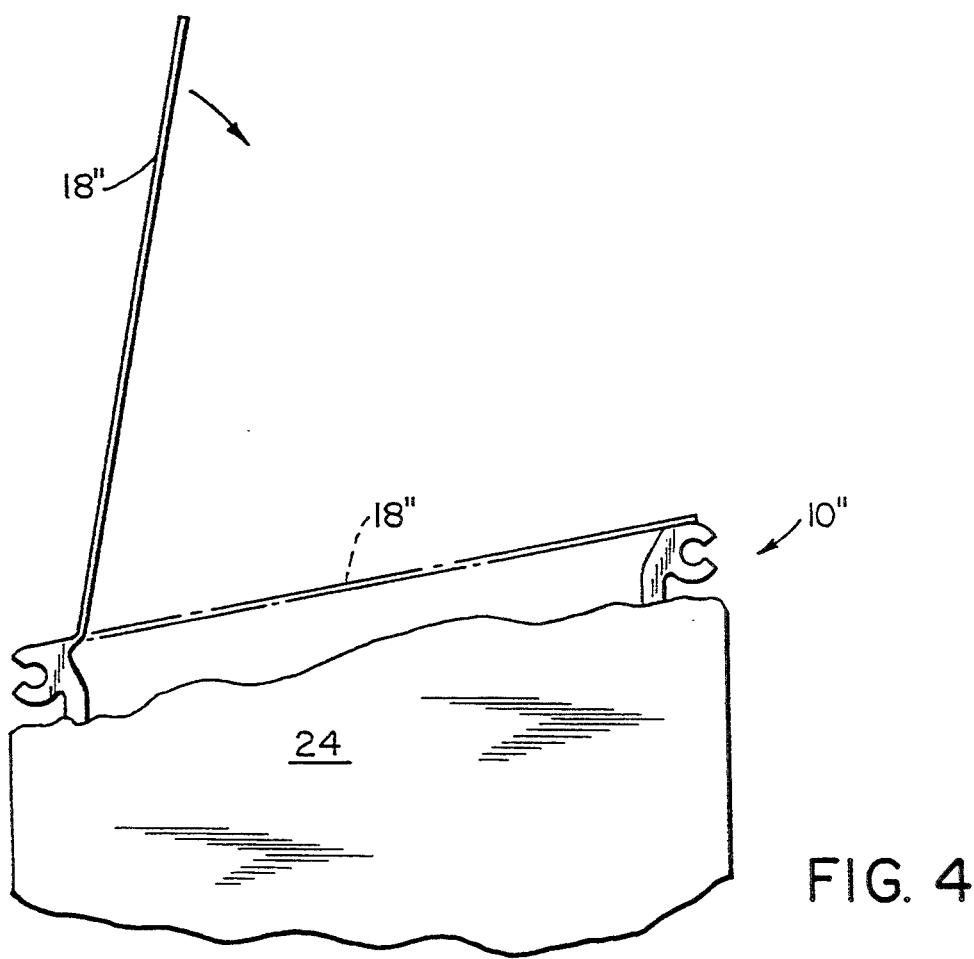
FIG. 4 is a view similar to FIG. 3 illustrating a further modification of the invention.

A still further modification is illustrated in FIG. 4. In this modification, the canister 10" is extruded, not as a tube but as a trough having an open cover 18". In this version, after extrusion the cover 18" is rotated downwardly into the closed position and secured by means of solvent-welding, cementing, or other methods, to close the top of the canister 10".

Figure 5:
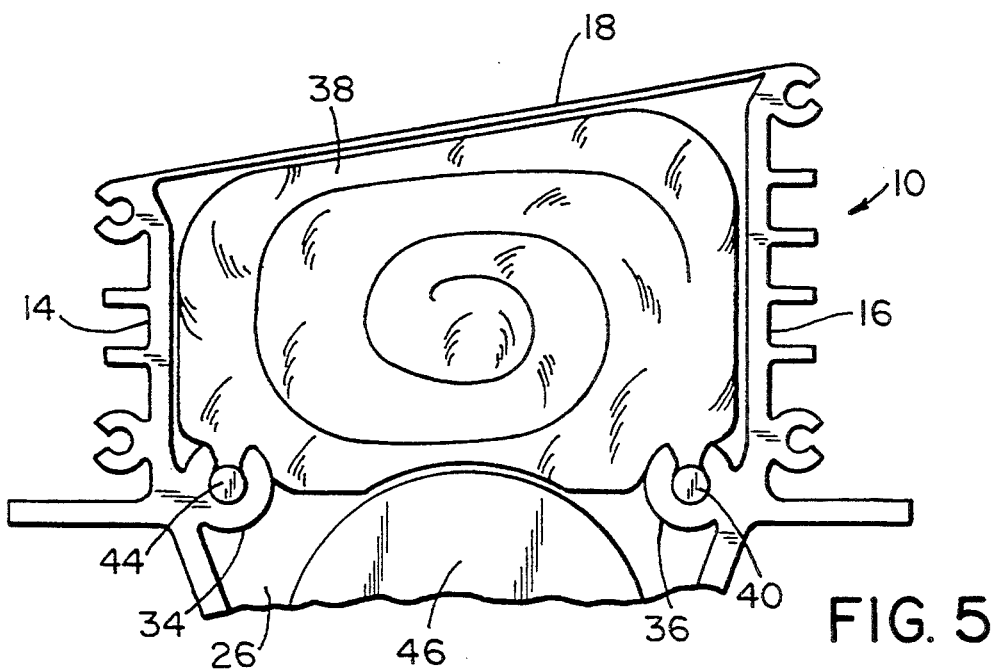
FIG. 5 is an end view of a portion of the reaction canister with the end plate removed, illustrating the airbag installation.
Figure 6:
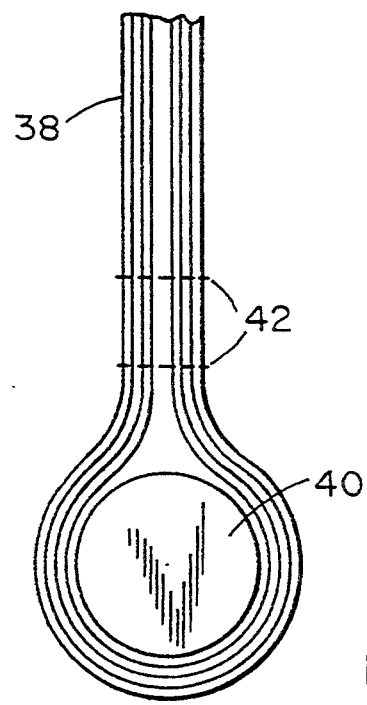
FIG. 6 is an enlarged detail of a portion of the mouth of the airbag of FIG. 5.

As is illustrated in FIG. 5, the inner surfaces of the left sidewall 14 and the right sidewall 16 carry parallel left semi-cylindrical channel 34 and right semi-cylindrical channel 36. A folded airbag 38 is housed within the canister and above the channels. The airbag 38 has a rectangular mouth. The material forming opposite edges of the mouth is wrapped around a dowel or rod 40 which is retained by sewing or otherwise sealing the airbag material along the lines 42 as shown in FIG. 6. The completed airbag thus includes a rectangular mouth incorporating stiff rods 40, 44 on opposite sides of the mouth.

Assembly of the airbag module begins by cutting the extruded canister 10 to the desired length. The airbag is then folded and the two dowels 40, 44 sewn into opposite sides of its rectangular mouth are inserted into the semi-cylindrical channels 34, 36 as illustrated in FIG. 5. The bag material extends through the slots running along the tops of the channels as illustrated. The end plates 24, 26 are attached to the ends of the canister 10 by using the screws 28. Thereafter a cylindrical gas generating inflator 46 is conventionally inserted through the end plate openings with its circular base 48 flush against the end plate 24 as illustrated in FIG. 1.

Referring now to FIG. 5, it will be apparent that opposite edges of the rectangular mouth of the airbag 38 are held apart by means of the rods 40, 44 in the channels 34, 36. The other edges of the mouth are adjacent the respective end plates 24, 26. When a crash occurs, the gases generated by the inflator 46 rapidly fill the airbag 38 and the unrestrained edges of its mouth are simply urged against their respective endplates. The expanding bag splits the cover along its tearline 30 causing it to open as illustrated in either of FIGS. 1 and 3. The cover 18 may, but need not be, a portion of the vehicle instrument panel. In any event, it both secures and retains the airbag within the module and serves as a protective covering to prevent foreign objects from entering the airbag and module cavity.

It will now be apparent that the present invention substantially reduces the number of component parts required in an airbag module. It also simplifies the assembly of such a module, provides a protective cover, and results in a lighter weight module than has been known to the prior art.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an airbag assembly for use in a motor vehicle comprising a rigid trough-shaped housing having a top and first and second ends, first and second end plates closing the respective first and second ends of said housing, an airbag within said housing having an open mouth, and an inflator within said housing connected to inflate the airbag through its open mouth, the improvement comprising:
    a cover and the housing being of a one piece construction comprising a tear line extending along the cover.

2. The improvement of claim 1 wherein said housing includes first and second channels extending along its length on respectively opposite sides of said inflator and wherein the mouth of said airbag is substantially rectangular and is secured to said channels by first and second rods carried by opposite sides of said rectangular mouth and retained within the respective first and second channels.

3. An article of manufacture for use as a component of an airbag restraint module which comprises:
    a one-piece construction including an airbag cover portion and an airbag housing portion wherein
    (a) the housing portion is trough-shaped, having first and second sides defining a top therebetween and first and second open ends,
    (b) the cover portion is integral with one of said sides and extends between said first and second ends for closing said top, and
    (c) said cover defines opening means along its length between said first and second ends for opening the trough-shaped housing upon ininflation of an airbag within said trough-shaped housing.

4. The article of claim 3 wherein said cover is integral with both of said first and second sides to form a tube.

5. The article of claim 4 wherein said cover defines a tearline along its length between said first and second ends.

6. The article of claim 3 wherein the inner surfaces of said first and second sides carry respective first and second substantially parallel, semi-cylindrical, channels extending between said first and second ends.

7. The article of claim 6 wherein said cover is integral with both of said first and second sides to form a tube.

8. The article of claim 7 wherein said cover defines a tearline along its length between said first and second ends.

9. The method of manufacturing a passenger side airbag restraint module which comprises:
    extruding a trough-shaped housing and integral cover as one piece;
    cutting said housing and cover to a desired length to form first and second open ends;
    inserting into said housing a collapsed airbag having an open, substantially rectangular, mouth;
    closing the first and second open ends with respective first and second end plates; and
    inserting into said housing and between said end plates, a substantially cylindrical inflator.

* * * * *